Dec. 5, 1961   R. J. MENICHELLO   3,011,315
AUTOMATIC SLACK ADJUSTER FOR BRAKES
Filed April 24, 1959

INVENTOR.
RALPH J. MENICHELLO,
BY
McMorrow, Berman & Davidson
ATTORNEYS.

United States Patent Office 3,011,315
Patented Dec. 5, 1961

3,011,315
AUTOMATIC SLACK ADJUSTER FOR BRAKES
Ralph J. Menichello, Scranton, Pa.
(279 Grand Ave., Johnson City, N. Y.)
Filed Apr. 24, 1959, Ser. No. 808,833
6 Claims. (Cl. 60—54.6)

This invention relates to a novel automatic slack adjuster for hydraulic brake wheel cylinders, which serves to compensate for wear of the brake linings on brake shoes operated by the cylinders.

By way of background, it may be noted that in wheel brakes of the type having a hydraulic wheel cylinder, a piston means working in said cylinder, and a push rod or its equivalent interposed between the piston means and shoe, it is common practice to provide a retractor spring that pulls the shoe away from the drum whenever fluid pressure is relieved. Obviously, as wear of the brake lining progresses, the distance between the lining and the brake drum will become greater in the retracted shoe position. Therefore, each time the brakes are applied, the shoe must travel the full distance from its retracted to its brake-applying position in engagement with the drum.

As lining wear progresses, brake adjustments become necessary, by reason of the characteristics described above, and said adjustments may be made either manually or automatically. Automatic brake adjustment means, designed to produce self-adjustment of the components, have been devised. However, in some instances said means have proved excessively complicated to justify widespread commercial production, and in other instances, fully efficient operation has not been achieved.

The broad object of the present invention is to provide an automatically operating device adapted to compensate for wear of a brake shoe lining, which will not have any of the undesirable characteristics that have been noted in connection with previous automatic brake adjusters.

A more specific object is to provide an automatic brake-adjustment device that will be capable of incorporation in wheel cylinder assemblies that are already in use. It is proposed, in this regard, that the automatic adjustment device can thus be sold in the form of a conversion kit, which can be used in a conventional wheel brake, merely by substitution of the kit components for other components of the wheel cylinder assembly.

Still another object is to provide an automatic brake-adjustment device of the character stated wherein the installation of the component parts thereof can be effected swiftly and easily, and without the requirement of special skills.

Still another object is to so design the automatic brake-adjustment device as to eliminate completely the necessity of any modification or re-design of a conventional wheel cylinder housing, brake shoes, brake drum, push rods, retractor spring, or end boots of the wheel cylinder housing.

Yet another object is to so design the automatic brake-adjustment device as to not only permit the same to be used to advantage as a conversion kit to convert a wheel brake from a manually adjustable to an automatically adjustable type, but also to permit use of the invention in wheel cylinders that are in the process of manufacture. Thus, the invention can be used as part of a completely new brake, or alternatively, as an installation in an old brake. It is proposed, in this regard, to permit the manufacture of the device in both instances without requirement of modification of any components thereof.

A further important object of the invention is to provide a device of the character stated that will be of full efficiency when in operation, and will yet be capable of manufacture at a very low cost.

Other objects will appear from the following description, the claims appended thereto, and from the annexed drawing, in which like reference characters designate like parts throughout the several views, and wherein:

Figure 1:
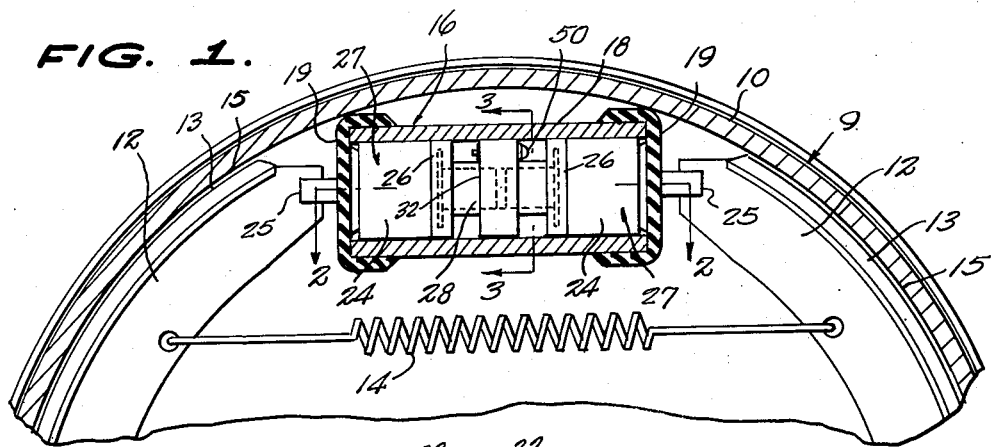
FIGURE 1 is a vertical sectional view through a portion of a wheel brake assembly, illustrating the automatic brake-adjustment device in elevation within a wheel brake cylinder that is shown in longitudinal section.

Referring to the drawing in detail, generally designated at 9 is a wheel brake that includes the usual brake drum 10, and the opposed, arcuate shoes 12 having linings 13. A retractor spring 14, connected between the shoes, normally draws the same toward one another about pivot pins, not shown, to the brake-releasing positions of the shoes shown in FIGURE 1. In such positions, relatively narrow spaces 15 are defined between the linings 13 and the drum 10. When the brakes are applied, the shoes are pivoted away from each other against the tension of spring 14, to bring the linings against the drums, with the shoes traveling a distance equal to the width of said space. Obviously, as lining wear progresses, the space will be increased in width, requiring more and more travel of the shoes to their brake-applying position.

All this is conventional construction and does not, per se, comprise part of the present invention.

Generally designated at 16 is a wheel cylinder, interposed between the distal ends of the shoes, said cylinder comprising a housing 18 open at both ends, and boots 19 applied to the ends of the housing. Intermediate the opposite ends of the housing 18, said housing is formed with a boss 20, having a counterbored port 22 communicating with a fluid-receiving cavity 23. A brake line, not shown, is adapted for engagement in the counterbore of port 22, in the usual manner, whereby upon application of the vehicle brakes, fluid is forced through the brake line into the cavity, thus to cause travel of opposed pistons 24 away from each other. This, in turn, through the medium of push rods 25 interposed between the pistons and shoes, causes the shoes to move away from each other to brake-applying positions.

Secured to the inner surfaces of the pistons are rubber piston cups 26, which cooperate with the pistons 24 in defining piston means generally designated 27 at opposite ends of the housing 18.

In this connection, it may be noted that all components so far described are wholly conventional, with the exception of the cups 26. In a typical arrangement, of a wheel cylinder assembly not having the automatic adjustment means comprising the present invention, the pistons are provided with cups, and are biased outwardly responsive to the direction of fluid pressure into the cavity 23, but in carrying out the invention, the peripheral flanges normally provided on the piston cups are undercut, for purposes to be made fully apparent hereinafter.

In accordance with the invention, there is mounted, within the ordinary wheel cylinder cavity 23, an inner casing 28 in the form of a tubular member extending axially of the housing, and formed open at its opposite ends. Inner casing 28 is integrally or otherwise rigidly formed, medially between its opposite extremities, with a transverse, wholly imperforate partition 30, thus to define at opposite sides of the partition fluid-receiving chambers 31 opening upon the ends of the casing. Designated at 32 is a collar integrally formed upon the inner casing, and extending circumferentially thereof. Said collar does not extend through the full circumference of the inner casing, as will be seen from FIGURE 3, but rather, is cut away as at 34 so as to define an opening 35 where the collar is cut away.

Slidable axially of the inner casing within the respective chambers 31 are adjuster elements or plugs 34, projecting through the respective open ends of the inner casing. The plugs are provided with circumferential grooves in which are engaged O-rings 36, providing a seal between the plugs and the side wall of the inner casing adapted to prevent leakage of fluid therebetween during the reciprocating movement of the plugs within their associated chambers 31.

The plugs 34 are formed with axial bores 40, which may have restrictions 41 at their inner ends, said bores communicating with the chambers 31.

End plates 42 of flat, circular formation are integrally formed upon the outer, projecting ends of the plugs 36. The end plates, adjacent their peripheries, are formed with annular series of apertures 44, designed to provide for communication between the cavity 23 and the bores 40.

Designated at 45 are peripheral flanges formed upon the pistons 26, said flanges being undercut so as to define annular, overhanging abutments on the pistons engaging the marginal portions of the end plates. Defined by the undercut flanges are relatively shallow recesses 46 formed in the cups 26, with the end plates being disposed in said recesses.

The end plates are of a thickness less than the depth of the recesses measured between the overhanging abutments and the bottom surfaces of the recesses. Therefore, the end plates are permitted movement to a limited extent in respect to the end cups, though being positively connected to the piston means for travel with the piston means. It will be observed that the arrangement wherein undercut flanges engage the marginal portions of the end plates, said end plates being loosely engaged in the recesses, constitutes a lost-motion connection between the plugs and the piston means, whereby the piston means will pull the plugs therewith during the outward travel of the piston means in the application of the brakes. Due to the lost-motion connection, there will be a certain amount of piston travel before the plugs begin to move therewith. In other words, if the end plates are engaged against the bottoms of the recesses, the pistons must travel outwardly a short distance, until the overhanging flanges engage the end plates in the manner shown in FIGURE 2, after which further outward travel of the pistons will cause the plugs to move therewith. When the pistons have moved outwardly to their maximum extent with the brake shoes engaged against the surface of the drum, retraction of the pistons responsive to contraction of the retractor spring 14 will cause movement of the pistons toward each other to a small degree before the plugs 34 are placed under a pressure tending to move the same inwardly. This produces certain characteristics in the mechanism that will be discussed at greater length hereinafter.

Figure 3:
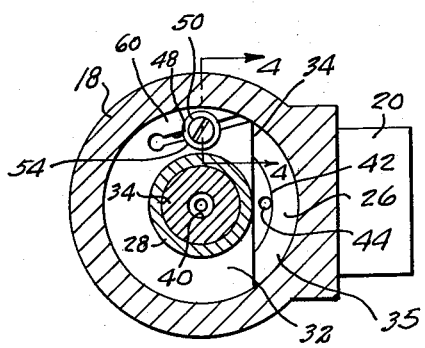
FIGURE 3 is a transverse sectional view on the same scale as FIGURE 2, taken substantially on line 3—3 of FIGURE 1.
Figure 4:
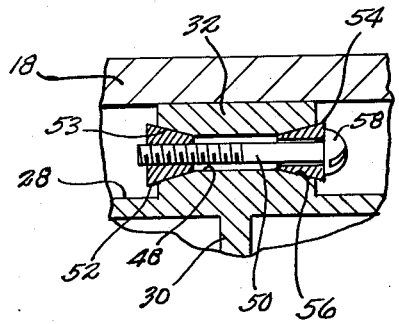
FIGURE 4 is a still further enlarged, detail sectional view substantially on line 4—4 of FIGURE 3, showing the means for mounting the device in the wheel cylinder housing.

The inner casing is adapted to be fixedly mounted within the wheel cylinder housing, through the provision of a means shown in FIGURE 3. Formed in the collar 32 is a slot 48, which extends chordally of the collar, said slot opening upon the periphery of the collar immediately adjacent the opening 34, in a typical commercial embodiment shown in FIGURE 3. The slot 48 is adapted to receive a screw 50, and threadedly engaged with the screw is a nut 52 of frusto-conical shape, defining a wedge adapted to engage in a complementarily shaped recess formed in one side of the collar in communication with the slot 48, said recess being designated 53. A sleeve 54 has a smooth walled bore receiving the screw, and is also of frusto-conical or wedge shape, though shaped oppositely to the nut 53. Sleeve 54 is adapted to engage in a complementarily shaped recess 56 formed in the other side of the collar in communication with the slot 48. Sleeve 54 bears against the head 58 of the screw, and accordingly it will be seen that on turning of the screw in one direction, the nut 52 and sleeve 54 will be moved relatively to each other inwardly of the recesses 53, 56. This, in turn, produces a widthwise expansion of the slot 48, whereby to shift outwardly a tongue 60 defined in the collar by the slot (FIGURE 3). Radial expansion of the collar into binding engagement with the wall of the housing 18 is thus produced, whereby to fixedly mount the inner casing within the housing.

It is important to note that the device is so designed as to be capable of installation in wheel brake assemblies already in use. Thus, the components of the device can be packaged in kit form, as a conversion kit for the purpose of converting an ordinary, manually adjustable wheel brake of the hydraulic type into a self-adjusting brake mechanism. In the installation procedure, one merely mounts the inner casing within the housing 18 in the manner described above. Then, the plugs 34 are inserted, said plugs being engaged with the flanges 45. The piston cups can be pre-assembled with the plugs in some instances, while in other instances, the piston means can be inserted after installation of the plugs. In this event, the flanges 45 may be temporarily deformed to permit entrance of the end plates. Of course, any of various installation procedures may be employed, and those described are merely illustrative of procedures that can be employed with maximum ease by workers who are relatively unskilled, to convert ordinary brakes into self-adjusting brake assemblies.

In use of the device, on application of the brakes, fluid will be forced under pressure through the port 22, into cavity 23. The fluid exerts pressure against the piston cups 26, forcing the same away from each other. This causes, through the medium of the push rods 25, the expansion of the shoes 12 to cause their linings 13 to bind against drum 10, thereby applying the brakes.

When the piston means 27 move outwardly to apply the brakes, the engagement of the flanges 45 with the end plates 42, after lost motion distance 64 has been taken up, will cause said travel of the piston means to produce corresponding movement of the plugs 34 outwardly of the chambers 31. The end plates 42, being spaced away from the bottoms of recesses 46, will permit the flow of fluid from cavity 23 into bores 40, passing through holes 44 and recesses 46, the parts being in the FIGURE 2 position at this time. Said fluid is thus caused to travel into the chambers 31 in back of the plugs.

Assuming now that the brakes are released, retractor spring 14 tends to contract. Shoes 12 move away from drum 10, and of course, the pistons travel toward each other within housing 18.

Figure 2:
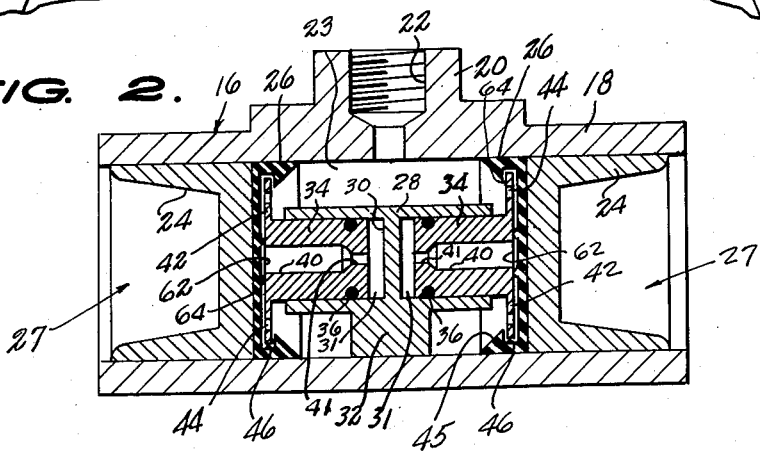
FIGURE 2 is an enlarged longitudinal sectional view through the wheel cylinder assembly substantially on line 2—2 of FIGURE 1, the boots and push rods being omitted.

The pistons, however, can travel toward each other only to the extent of the distance between end plates 42 and annular sealing ribs 62 formed upon the piston cups in surrounding relation to bores 40 (FIGURE 2). The sealing ribs 62 act to space the body pistons or plugs 34 from the operating pistons 27. This distance has been designated at 64 in FIGURE 2. The space or distance 64 permitted the pistons for travel in brake-releasing directions is sufficient to move linings 13 away from the drums 10. Obviously, the spaces 15 shown in FIGURE 1 will be equal to the spaces or distances 64. This is so because on the movement of the pistons inwardly toward each other following relieving of the fluid pressure, the plugs 34 will not move inwardly, due to the fact that as soon as seals or ribs 62 engage the ends of the plugs, fluid within chambers 31 will be trapped and will be denied exit. Therefore, there is no retraction or inward travel of the plugs 34, from positions to which they are moved outwardly of the chambers 31.

This maintains the brake linings in a constant, predetermined, closely spaced relationship in respect to the drum 10. Assuming now that brake lining wear progresses during repeated application of the brakes, the ordinary tendency of the spaces 15 to increase will never occur. This is by reason of the fact that each application of the brakes will cause plugs 34 to be pulled outwardly, if brake wear has occurred, to cause a constant relocation of the plugs 34 in progressively extended positions. In other words, each time the pistons tend to move outwardly of the housing 18, a greater distance than in a previous brake application due to wear of the brake lining, the further travel of the pistons in an outward direction is greater than the last-previous outward movement of the pistons only to the extent of the wear that has occurred in the linings. The plugs 34 will be moved outwardly, accordingly, only to this extent, and as noted above, do not have a tendency to move inwardly on release of the brake, due to the fact that the fluid trapped in the chambers 31 prevents this.

Throughout the effective life of the brake linings, accordingly, said linings will automatically be retained, at all times, a predetermined distance shown at 15, from the drums 10, and this will occur automatically, with complete elimination of manual adjustments.

It will be observed that the plugs 34 and their associated piston means 27 actually comprise check valve assemblies, in that the plugs 34 constitute valve seats and the piston means 27 constitute the valve elements, said check valve assemblies being operative, when the piston means move away from each other, to open positions permitting inflow of fluid from the cavity 23 to the chambers 31. On travel of the piston means 27 inwardly toward one another, said check valve assemblies are operated to closed positions, to prevent return flow of the fluid to the cavity.

In the illustrated example, the invention has been applied to a typical hydraulic brake construction, wherein there is a wheel cylinder having pistons at both ends, said wheel cylinder being interposed directly between the distal ends of opposed brake shoes. The invention is, however, applicable to equal advantage in other types of brake installations. For instance, in some hydraulic brakes there are arrangements wherein only one brake shoe operates from a wheel cylinder, as distinguished from the illustrated example wherein both brake shoes operate from the same cylinder. In this case, only half of the illustrated mechanism would be used, that is, in the single-ended cylinder, there would be provided an inner casing that is correspondingly of single-ended formation, opening only toward the open end of the wheel cylinder. This is believed sufficiently obvious as not to require special illustration herein.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

What is claimed is:

1. A slack adjustor for a wheel brake cylinder having brake shoe operating pistons in its opposite ends, a tubular body adapted to be positioned in the cylinder between the pistons, means mounting said body axially in the cylinder and in concentrically spaced relation thereto, a fixed partition wall in said body and spaced from the ends of the body and dividing the interior of said body into cylinders, pistons sliding in said body cylinders and having outer ends reaching beyond related ends of the body and inner ends facing said partition wall, bores extending through said body pistons, said bores having restricted inner ends opening into the body cylinders, enlarged diameter apertured annular flanges fixed on the outer ends of the body pistons, lost motion means bearing against the flanges for connection to the operating pistons of the wheel cylinder, and means on said lost motion means for spacing the body pistons away from the operating pistons and closing the outer ends of said bores.

2. In combination, a wheel brake cylinder having a sidewall, a brake fluid line port traversing said sidewall at a point intermediate the ends of the cylinder, brake shoe operating pistons sliding in the ends of the cylinder, said pistons having resilient cups fixed on their inner ends, a slack adjustor positioned within said cylinder between the cups, said adjustor comprising a tubular body smaller in diameter than said cylinder, means positioning the body in concentrically spaced relation to the cylinder sidewall, said body being shorter than the distance between said cups, a fixed partition wall in said body and spaced from its ends, pistons sliding in the ends of the body, said body pistons having inner ends spaced from said partition wall and outer ends which reach beyond the ends of the body, said body pistons being formed with longitudinal bores having restrictions at their inward ends which open to the spaces between the partition wall and the inner ends of the body pistons, enlarged diameter perforated annular flanges fixed on the outer ends of the body pistons, said flanges having peripheral edges spaced from the wheel cylinder sidewall and inward sides, said wheel cylinder piston cups having webs having portions surrounding the flanges, stops on said portions spaced inwardly from the webs and engaged with the inward sides of said flanges and limiting inward movements of the body pistons away from the cups, and inwardly extending sealing elements on said webs for closing the outer ends of the body piston bores and spacing the body pistons from the webs.

3. In combination, a wheel brake cylinder having a sidewall, a brake fluid line port traversing said sidewall at a point intermediate the ends of the cylinder, brake shoe operating pistons sliding in the ends of the cylinder, said pistons having resilient cups fixed on their inner ends, a slack adjustor positioned within said cylinder between the cups, said adjustor comprising a tubular body smaller in diameter than said cylinder, means positioning the body in concentrically spaced relation to the cylinder sidewall, said body being shorter than the distance between said cups, a fixed partition wall in said body and spaced from its ends, pistons sliding in the ends of the body, said body pistons having inner ends spaced from said partition wall and outer ends which reach beyond the ends of the body, said body pistons being formed with longitudinal bores having restrictions at their inward ends which open to the spaces between the partition wall and the inner ends of the body pistons, enlarged diameter perforated annular flanges fixed on the outer ends of the body pistons, said flanges having peripheral edges spaced from the wheel cylinder sidewall and inward sides, said wheel cylinder piston cups having webs having portions surrounding the flanges, stops on said portions spaced inwardly from the webs and engaged with the inward sides of said flanges and limiting inward movements of the body pistons away from the cups, and inwardly extending sealing elements on said webs for closing the outer ends of the body piston bores and spacing the body pistons from the webs, said cups having inward faces, said stops being spaced from said inward faces at distances greater than the thicknesses of the said flanges.

4. In combination, a wheel brake cylinder having a sidewall, a brake fluid line port traversing said sidewall at a point intermediate the ends of the cylinder, brake shoe operating pistons sliding in the ends of the cylinder, said pistons having resilient cups fixed on their inner ends, a slack adjustor positioned within said cylinder between the cups, said adjustor comprising a tubular body smaller in diameter than said cylinder, means positioning the body in concentrically spaced relation to the cylinder sidewall, said body being shorter than the distance between said cups, a fixed partition wall in said body and spaced from the ends, pistons sliding in the ends of the body, said body pistons having inner ends spaced from said partition wall and outer ends which reach beyond the ends of the body, said body pistons being formed with longitudinal bores having restrictions at their inward ends which open to the spaces between the partition wall and the inner ends of the body pistons, enlarged diameter perforated annular flanges fixed on the outer ends of the body pistons, said flanges having peripheral edges spaced from the wheel cylinder sidewall and inward sides, said wheel cylinder piston cups having webs having portions surrounding the flanges, stops on said portions spaced inwardly from the webs and engaged with the inward sides of said flanges, said cup portions also including means for spacing the body pistons away from the operating pistons and closing the outer ends of said bores, said means comprising an external collar partially surrounding said body at a point intermediate the ends thereof and having a periphery engaged with the wheel cylinder sidewall, said collar having a portion spaced from the wheel cylinder sidewall providing a passage for brake fluid from said port to the body piston bores and the body cylinders.

5. In combination, a wheel brake cylinder having a sidewall, a brake fluid line port traversing said sidewall at a point intermediate the ends of the cylinder, brake shoe operating pistons sliding in the ends of the cylinder, said pistons having resilient cups fixed on their inner ends, a slack adjustor positioned within said cylinder between the cups, said adjustor comprising a tubular body smaller in diameter than said cylinder, means positioning the body in concentrically spaced relation to the cylinder sidewall, said body being shorter than the distance between said cups, a fixed partition wall in said body and spaced from the ends, pistons sliding in the ends of the body, said body pistons having inner ends spaced from said partition wall and outer ends which reach beyond the ends of the body, said body pistons being formed with longitudinal bores having restrictions at their inward ends which open to the spaces between the partition wall and the inner ends of the body pistons, enlarged diameter perforated annular flanges fixed on the outer ends of the body pistons, said flanges having peripheral edges spaced from the wheel cylinder sidewall and inward sides, said wheel cylinder piston cups having webs having portions surrounding the flanges, stops on said portions spaced inwardly from the webs and engaged with the inward sides of said flanges, said cup portions also including means for spacing the body pistons away from the operating pistons and closing the outer ends of said bores, said means comprising an external collar partially surrounding said body at a point intermediate the ends thereof and having a periphery engaged with the wheel cylinder sidewall, said collar having a portion spaced from the wheel cylinder sidewall providing a passage for brake fluid from said port to the body piston bores and the body cylinders, and wedge means on said collar wedged against the brake cylinder sidewall.

6. In combination, a wheel brake cylinder having a sidewall, a brake fluid line port traversing said sidewall at a point intermediate the ends of the cylinder, brake shoe operating pistons sliding in the ends of the cylinder, said pistons having resilient cups fixed on their inner ends, a slack adjustor positioned within said cylinder between the cups, said adjustor comprising a tubular body smaller in diameter than said cylinder, means positioning the body in concentrically spaced relation to the cylinder sidewall, said body being shorter than the distance between said cups, a fixed partition wall in said body and spaced from the ends, pistons sliding in the ends of the body, said body pistons having inner ends spaced from said partition wall and outer ends which reach beyond the ends of the body, said body pistons being formed with longitudinal bores having restrictions at their inward ends which open to the spaces between the partition wall and the inner ends of the body pistons, enlarged diameter perforated annular flanges fixed on the outer ends of the body pistons, said flanges having peripheral edges spaced from the wheel cylinder sidewall and inward sides, said wheel cylinder piston cups having webs having portions surrounding the flanges, stops on said portions spaced inwardly from the webs and engaged with the inward sides of said flanges, said cup portions also including means for spacing the body pistons away from the operating pistons and closing the outer ends of said bores, said means comprising an external collar partially surrounding said body at a point intermediate the ends thereof and having a periphery engaged with the wheel cylinder sidewall, said collar having a portion spaced from the wheel cylinder sidewall providing a passage for brake fluid from said port to the body piston bores and the body cylinders, said collar having a chordal slot opening to the periphery of the collar and defining a wedge tongue between the slot and the periphery of the collar, and wedge means engaged in the slot for spreading the tongue against the brake cylinder sidewall.

References Cited in the file of this patent
UNITED STATES PATENTS

| 2,234,689 | Chard | Mar. 11, 1941 |
| 2,513,015 | Fike | June 27, 1950 |
| 2,638,750 | Hettinger | May 19, 1953 |